United States Patent [19]

Granryd

[11] 4,224,972
[45] Sep. 30, 1980

[54] COMBINATION WINCH AND TRACTION INTENSIFIER FOR RUBBER TIRED VEHICLES

[76] Inventor: Thorvald G. Granryd, 825 N. Sheridan, Lake Forest, Ill. 60045

[21] Appl. No.: 873,374

[22] Filed: Jan. 30, 1978

[51] Int. Cl.² ............................................ B06C 27/06
[52] U.S. Cl. ................................ 152/213 A; 152/239
[58] Field of Search ............... 152/213 R, 213 A, 214, 152/216, 225 R, 226, 241, 239; 254/166, 216, 88, 172; 238/14; 81/15.8

[56] References Cited

U.S. PATENT DOCUMENTS

| 1,561,806 | 11/1925 | Thomas | 238/14 |
|---|---|---|---|
| 2,646,099 | 7/1953 | Johnson | 152/213 R |
| 3,028,901 | 4/1962 | Batori | 152/239 |
| 3,532,149 | 10/1970 | McCord | 152/213 R |
| 3,817,307 | 6/1974 | Detwiler | 152/239 X |
| 3,867,974 | 2/1975 | Crockett | 152/213 R |

FOREIGN PATENT DOCUMENTS 2013379 12/1971 Fed. Rep. of Germany .......... 152/213

Primary Examiner—Robert W. Saifer
Assistant Examiner—Gene A. Church
Attorney, Agent, or Firm—August E. Roehrig, Jr.

[57] ABSTRACT

A winching and traction intensifying device for extricating an immobilized rubber tired vehicle. The device has a traction intensifying portion secured to a driving tire and an anchoring portion connected to the traction intensifying portion. A corresponding non-driving tire secures the anchoring portion through the weight of the vehicle itself to establish a necessary fixed point for the winching device while, simultaneously, the traction intensifying portion is coupled to the driving tire.

10 Claims, 7 Drawing Figures

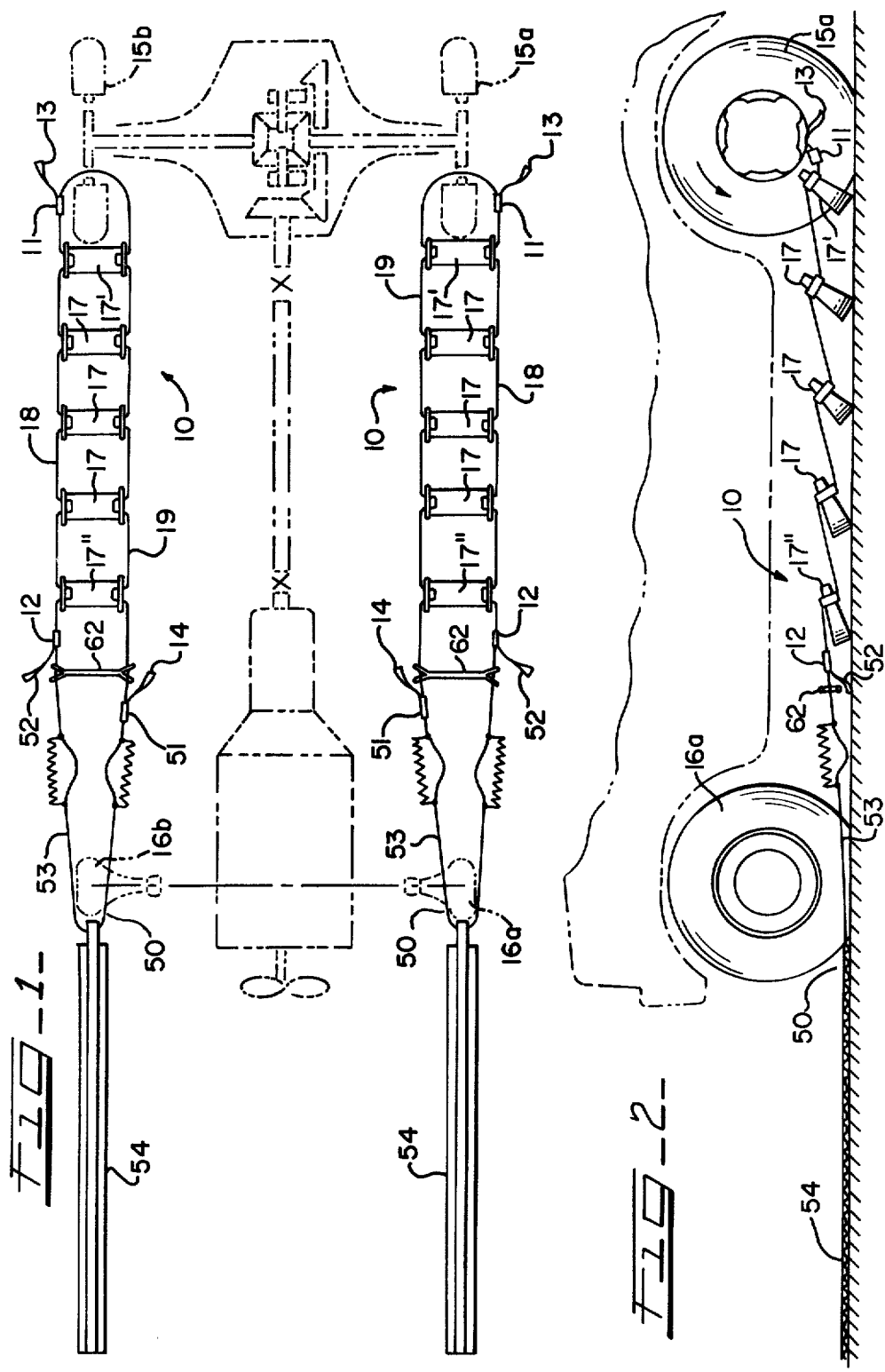

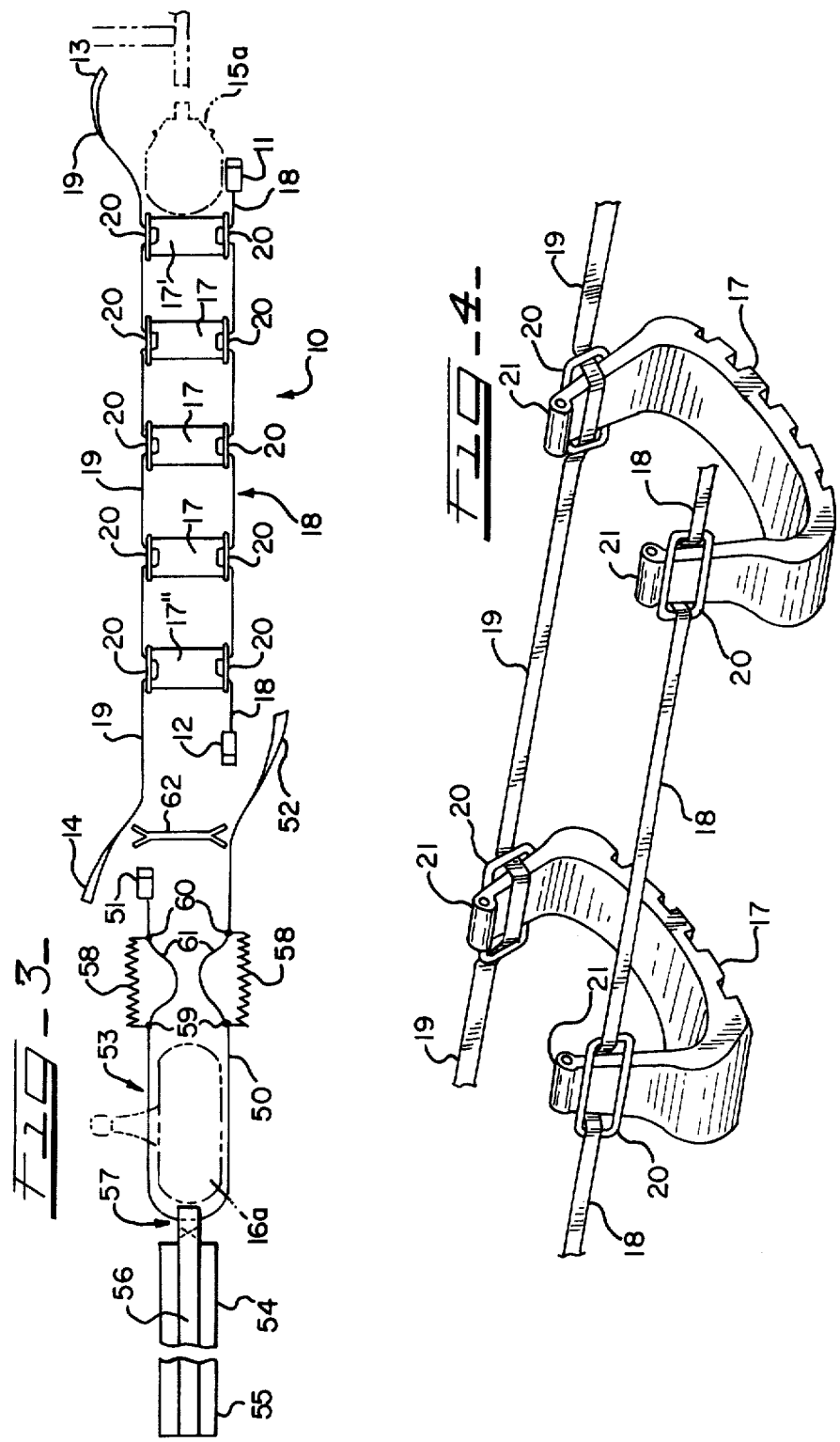

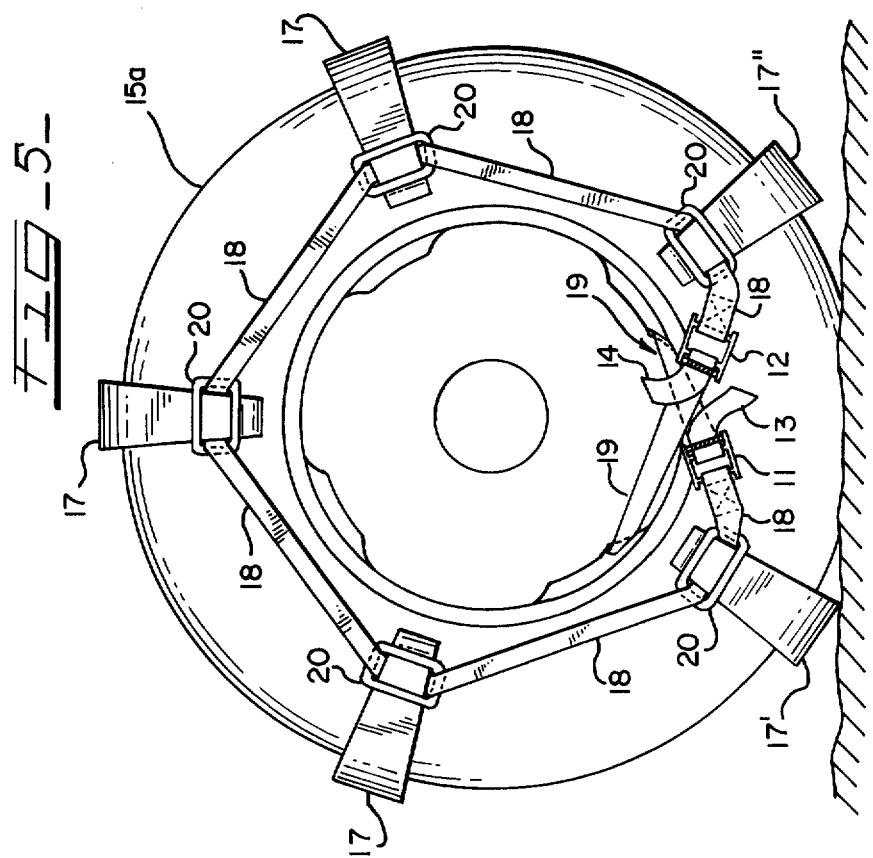
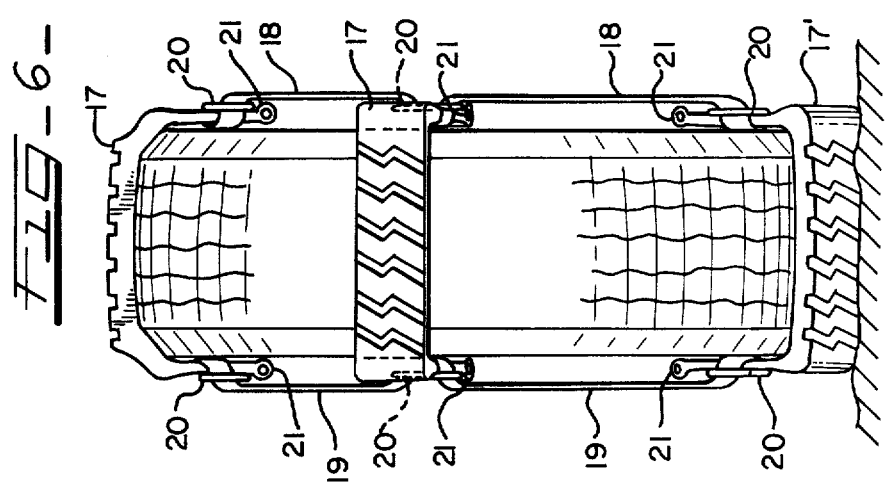

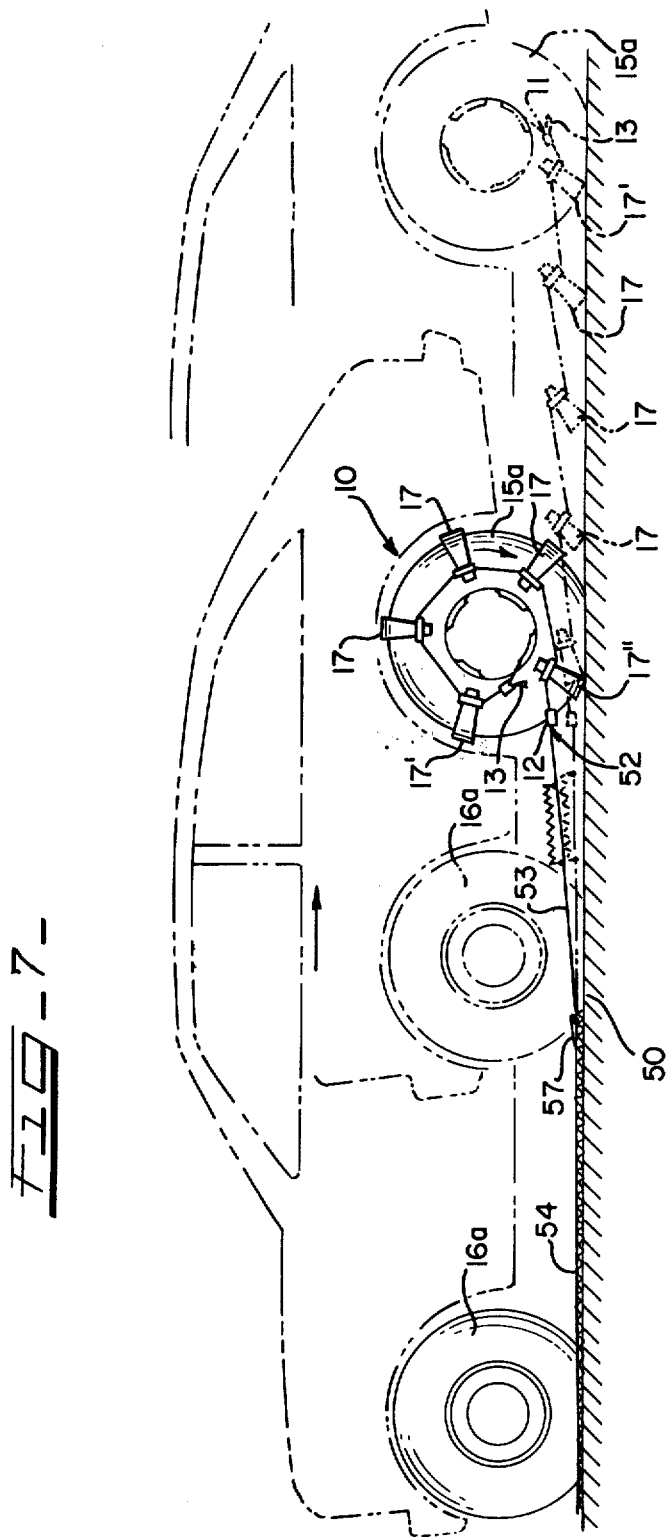

COMBINATION WINCH AND TRACTION INTENSIFIER FOR RUBBER TIRED VEHICLES

BACKGROUND OF THE INVENTION

This invention relates generally to an apparatus and method for extricating an immobilized rubber tired vehicle and, in particular, to a winching and traction intensifying apparatus and method which utilizes the weight of the vehicle exerted upon the non-driving tires to provide an anchor point for the winching action and includes a novel traction intensifying portion which fits the outer contour of and is rolled up upon the driving tires.

Various types of winching devices have been employed to enable an immobilized vehicle to extricate itself. Traditionally, they have been either permanently mounted and electrically driven by power furnished by the vehicle engine, or they have been temporarily mounted and secured to the hubs of the driving wheels by winching drums. Devices of both types are not only cumbersome and expensive, but also depend upon some foreign fixed object to provide the necessary anchor point for the winching action.

Numerous approaches have been taken to improve upon vehicle traction characteristics while negotiating adverse ground conditions. For example, one well known approach is the so-called "snow tire". Snow tires have a tread configuration consisting of deep grooves located between protruding ribs for extra gripping action. However, this configuration is frequently inadequate since, in order to provide a reasonably smooth ride, the protrusions must be located at the sides of the tire tread where very little of the vehicle's weight is exerted upon the ground surface.

A second approach to the problem has been to insert numerous studs in the tire itself and has been used in combination with the snow tire concept discussed earlier. These studs protrude from the center portion of the tread itself and are generally regarded as an effective means of improving traction. However, since the studs are normally fashioned from a hard, wear resistant material such as hardened steel, they tend to damage paved roadways, and, in fact, are prohibited by law in many locations.

Snow chains have also become widely accepted as a traction intensifying device; although they are becoming increasingly unpopular because they are expensive, cumbersome to install and remove, and noisy in operation.

The present invention overcomes these and other problems associated with prior art vehicle extricating systems and traction intensifying devices by employing a relatively easily installed winching device which eliminates the need for a foreign fixed point by using the vehicle weight itself, as transmitted through the non-driving tires to the supporting surface, to provide an anchor.

Simultaneously, while an immobilized vehicle is winching itself out of its predicament, a resilient, non-metallic traction intensifying means conforming to the outer contour of the driving tires is rolled up tightly about the circumference of the driving tires thereby giving them superior traction characteristics.

SUMMARY OF THE INVENTION

It is, therefore, an object of this invention to improve upon traction intensifiers for rubber tired vehicles, capable to function as snow tires, studded tires, snow chains, and the like.

It is another object of this invention to enable an immobilized vehicle to extract itself from its predicament.

A further object of this invention is to improve the traction of rubber tired vehicles by tightly rolling traction intensifiers upon the driving tires simultaneously.

Still another object of this invention is to improve intensifiers by forming traction bars in a configuration which essentially follow the transverse outer contour of a driving tire.

A still further object of this invention is to improve traction intensifiers, by making them easily adjustable to fit tightly upon various size tires.

These and further objects and attained in accordance with the present invention wherein there is provided a winching and traction intensifying device for extricating an immobilized rubber tired vehicle wherein the device has a traction intensifying portion secured to a driving tire and an anchoring portion connected to the traction intensifying portion. The anchoring portion is positioned adjacent a corresponding non-driving tire to roll upon the anchoring portion transmitting the weight of the vehicle to the anchoring portion for establishing a necessary fixed point for the winching device while, simultaneously, the traction intensifying portion rolls up around and is secured to the driving tire.

DESCRIPTION OF THE DRAWINGS

Further objects of the invention together with additional features contributing thereto and advantages accruing therefrom, will be apparent from the following description of preferred embodiments of the invention, which are shown in the accompanying drawings with like reference numerals indicating corresponding parts throughout, wherein:

FIG. 1 is a top plan view of the device and the arrangement as intended for a passenger car or the like;

FIG. 2 is a side elevational view of the device shown in FIG. 1;

FIG. 3 is a schematic top plan view of the device, positioned for one side of a vehicle;

FIG. 4 is a perspective view of a portion of a traction intensifier, showing traction bars, coupling means between said bars and link means for securing and length adjustment;

FIG. 5 is a side view of the traction intensifier as installed;

FIG. 6 is a front view of the device shown in FIG. 5; and

FIG. 7 is a side view, showing a method for removing the traction intensifier from a driving tire.

DESCRIPTION OF THE PREFERRED EMBODIMENTS

Referring now to FIGS. 1 and 2 there is shown an overall arrangement of a combination winch and traction intensifier positioned to either extricate a stuck rubber tired vehicle or, alternatively, having the traction intensifier installed upon the two driving tires of an unstuck vehicle. A traction intensifier 10 is shown coupled to an anchoring assembly 50. The traction intensifier 10 has four ends, namely buckles 11 and 12 and two free ends 13 and 14. The anchoring assembly 50 is connected to the intensifier 10 with a buckle 51 and a free coupling end 52. As shown, the buckle 11 and the free end 13 of the intensifier 10 are connected to a vehicle's driving wheels 15a and 15b, respectively, by threading the free end 13 through a suitable slot in the wheel of the driving tire 15a and 15b. As shown, the buckle 12 and the free end 14 of the intensifier 10 are indirectly connected to a vehicle's non-driving wheels 16a and 16b, respectively, by fastening to the free end 52 and the buckle 51 of the anchoring assembly 50, as will be hereafter described.

FIG. 3 shows the device positioned for installation to wheels 15a and 16b of a vehicle. The intensifier 10 comprises a plurality of traction bars 17, fastened transversely and equidistantly to couplings 18 and 19 by links 20. The coupling 18 has buckles 11 and 12 securely fastened thereto at each end, whereas coupling 19 has the free ends 13 and 14. The couplings 18 and 19 are preferably made from ordinary seatbelt webbing, being of light weight and possessing high breaking strength. FIG. 3 also shows the anchoring assembly 50, comprising a coupling 53 and anchor mat 54. The coupling 53 is also preferably made from ordinary seatbelt webbing. One end, 52, is free, while the opposite end is securely fastened to a buckle 51. The anchoring mat 54 is preferably made from elastomeric material having transverse corrugations 55 on the side which, in use, is positioned toward the ground surface. Seatbelt webbing 56 is molded into the entire length of the other side. At one end of mat 54, webbing 56 protrudes and forms a loop 57. Through this loop the coupling 53 is threaded. The coupling 53 has two tension springs 58 located as shown. Each spring 58 is fastened to webbing 53 at points 59 and 60 in such a way that slack 61 is formed in the webbing 53 when spring 58 is unstressed. The magnitude of the slack 61 is such that the spring 58 may be stretched near, but not beyond, its safe strength rating. FIGS. 1 through 3 also show a spreader bar 62, the purpose of which will be described later.

FIG. 4 shows a detailed portion of traction intensifier 10. Here, the traction bars 17 are made from regular tire casings which have been cut transversely into radial segments. Use of that particular embodiment of traction bars has several advantages. First, since the tire casing segments are made of the same or similar material as the driving tires, the strength characteristics are the same. Secondly, the tire casing segment configuration is such that it will essentially follow the contour of the driving tire, and thus the webbings 18 and 19 to which each traction bar is secured will be positioned near the center of the driving tires 15a and 15b thereby assuring that the traction intensifier will not disengage from the tire, even when the vehicle is negotiating sharp turns. In addition, each tire casing segment has a reinforcing bead 21 which enhances the locking action between the traction bars 17 and the webbings 18 and 19. Finally, the ready availability of blemished new and/or discarded tires renders tire casing segments easy and inexpensive to obtain.

FIG. 4 further shows one method for threading webbings 18 and 19 to the bars 17, by means of links 20. The tension created in the webbings 18 and 19 by the preloading springs 58 of coupling 53 in the anchoring assembly 50 makes it feasible to obtain locking action by one simple link 20, as shown. Having this simple method for fastening also lends itself well for adjustment of spacing between bars 17 to accommodate various size tires. Also, the breaking strength of the intensifier—as measured by the webbing strength—would be at least 5000×2=10,000 pounds (22270×2=4,540 kg), a characteristic of importance, particularly when the invention is employed as a winch.

Referring to the above, the procedure for extricating a stuck vehicle or, alternatively, simply installing the traction intensifier 10 on the driving tires of an unstuck vehicle may be accomplished as described below.

Intensifier 10 is laid on the ground in front of driving tires 15a. Free end 13 of webbing 19 is threaded through a suitable wheel slot and secured to buckle 11 of webbing 18. Anchoring assembly 50, is then laid in front of non-driving tire 16a. The side of coupling means 53 which has the buckle 51 is slung rearwardly on the inner side of the tire 16a and the opposing end of coupling means 53 laid along outside and rearwardly of it. The free end 14 of webbing 19 and the free end 52 of webbing 53 are inserted in the buckle 51 of webbing 53 and the buckle 12 of webbing 18, respectively. The free ends 14 and 52 are then pulled tightly against the force imposed by preloading springs 58. Spreader bar 62 is then placed transversely between the webbings as shown in FIGS. 1 and 2. At this point, the spreader bar 62 performs two functions, namely: the length of it is such that it will assure a smooth rolling-on of the intensifier 10 by spreading webbings 18 and 19 sufficiently apart to clear the tire, and it also exerts an additional preload on webbing 18, 19 and 53.

Anchoring mat 54 is then laid in front of and lined up with the direction of the non-driving tire 16a. A similar procedure is repeated for the opposite side of the vehicle. The vehicle engine is then started and transmission engaged in low gear forward. On front wheel drive vehicles, the procedure is the same, except the intensifier is laid behind the driving tire, the mat 54 behind the non-driving tire, and the transmission engaged in reverse gear. The vehicle is then driven until the "last" traction bar 17, contacts driving tire 15a, at which time the vehicle is stopped and the engine turned off. Spreader bar 62 is removed, which releases a portion of the preload tension on the webbing 53 which facilitates uncoupling of buckles 12 and 51. The free end 14 of webbing 19 is then threaded from inside of tire 15a through a suitable wheel slot and then securely tightened by means of the buckle 12 of webbing 18. The disconnecting of the intensifier from the anchoring assembly 50 is then repeated for the opposite side of the vehicle.

The entire procedure of extricating a stuck vehicle or alternatively rolling on both intensifiers 10, simultaneously upon tires of an unstuck vehicle, can expeditiously be done by a single person. The extricating or rolling on action needs only the attention of the driver, who keeps watch on the driving wheel on the driver's side of the vehicle only. It should be noted that both traction intensifiers 10 will be rolled up almost essentially equally even if one of the two driving tires 15a or 15b is in a rut while the other is on an entirely adequate ground surface. The two anchoring mats 54, in combination with the pretensioning provided mainly by the springs 58 of each of the two anchoring assemblies 50, will form a "closed loop", between the two sides of the vehicle chassis as the ends of the two intensifiers 10 are securely fastened to the driving wheels. Thus, virtually no differential action can take place during the procedure, and regardless of the specific mode of application, both driving tires 15a and 15b revolve at virtually an equal rate. Therefore, both intensifiers may be simultaneously secured to their respective driving tires as shown in FIGS. 5 and 6.

FIG. 7 shows one method by which the intensifier 10 may be removed. The anchoring assembly 50 is first laid between the driving and non-driving tires. The vehicle is then backed up upon anchoring mat 54 until traction bar 17" is about to leave contact with the ground. The vehicle is then stopped; the free end 14 of webbing 19 is uncoupled from the buckle 12 of webbing 18 and coupled to the buckle 51 of webbing 53, and the buckle 12 of webbing 18 is coupled to the free end 52 of webbing 53. The vehicle is then reversed and moved rearwardly until the traction bar 17' is about to leave contact with the ground surface as shown in dotted lines of FIG. 7. At this point the intensifier 10 is ready to be removed by uncoupling the free end 13 of webbing 19 from the buckle 11 of webbing 18. The same procedure is repeated for the remaining intensifier 10.

The foregoing description and figures depict an embodiment of the present invention comprising a plurality of traction bars. It has been discovered that variations in the number of traction bars employed in the practice of the invention will perform the intended function. One such configuration comprises a traction intensifying device having a single traction bar for each driving wheel. In this embodiment, preloading springs 58 and spreader bar 62 are eliminated. After the intensifier is secured to driving tire 15a, the vehicle is driven forward. Coupling 53 will wind itself upon the center portion of the driving tire. When it has turned approximately one revolution the vehicle is stopped. The buckle 12 is then released, anchor assembly 50 is removed, and couplings 18 and 19 are tightly connected via a suitable wheel slot, as described previously.

Although not shown in the figures, it is understood that the concept and design lends itself well not only to vehicles having single driving tires, but also heavier vehicles, such as dual-tired trucks, buses, farm tractors and the like.

Further, while the invention has been described in detail with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best modes contemplated for carrying out this invention, but that the invention will include all embodiments falling within the scope of the appended claims.

What is claimed is:

1. A device for extricating an immobilized rubber tired vehicle having a power driven drive wheel and a non-driven wheel comprising traction intensifying means for operative connection to a drive wheel of a vehicle for increasing the tractive force between the vehicle drive wheel and the surface upon which said drive wheel is supported, said traction intensifying means including resilient traction bar formed from cross section of tire casing segments with an outer surface-engaging contour in the configuration the same as the outer transverse cross sectional contour of the vehicle drive wheel with each end thereof mutually exclusively secured to one of a pair of longitudinally extending parallel coupling members for positioning each one of said resilient traction bars in spaced transversly extending relation between said coupling members, one of said pair of longitudinally extending parallel coupling members having buckle means at each end thereof and the other of said pair having the ends thereof free such that adjacent ends of said coupling members may be operatively connected to a vehicle driving wheel when said ends are interconnected, anchoring means operatively connected to a non-driven wheel of the vehicle and coupled to said traction intensifying means for providing a fixed anchor point for said traction intensifying means, relative to the non-driven vehicle wheel, said anchoring means including coupling means for coupling said traction intensifying means thereto, and spring means operatively connected to said coupling means for controlling the tension therein upon operative engagement of said traction intensifying means coupling members with the vehicle driven wheel.

2. A device for extricating an immobilized rubber tired vehicle as described in claim 1 wherein said spring means comprises a pair of springs operatively connected to said coupling means to pretension said extricating device.

3. A pair of devices for extricating an immobilized rubber tired vehicle as described in claim 1 wherein one of said pair of said extricating devices is positioned on one side of a rubber tired vehicle and the other of said pair of said extricating devices is simultaneously positioned on the other side of the rubber tired vehicle.

4. A device for extricating an immobilized rubber tired vehicle as defined in claim 1 wherein said longitudinally extending parallel coupling members comprise flat, flexible, foldable elements.

5. A device for extricating an immobilized rubber tired vehicle as described in claim 1 wherein said device has locking means for securing said traction bars to said longitudinally extending parallel coupling members, said locking means having means for selectively adjusting the spacing between said traction bars.

6. A device for extricating an immobilized rubber tired vehicle as described in claim 5 wherein said locking means comprises a plurality of links for securing said traction bars to said pair of longitudinally extending parallel coupling members to permit longitudinal and radial adjustment of said traction bars relative thereto.

7. A device for extricating an immobilized rubber tired vehicle as described in claim 1 including spreader bar means for pretensioning said pair of longitudinally extending parallel coupling members and maintaining adequate lateral space therebetween to assure easy roll on action of said extricating device.

8. A device for extricating an immoblized rubber tired vehicle as described in claim 5 wherein said locking means comprises a plurality of links operatively coupling said traction bars to said longitudinally extending parallel coupling members for providing longitudinal and radial adjustment therebetween.

9. A device for extricating an immobilized rubber tired vehicle as described in claim 7 wherein said spreader bar means comprises a rigid bar having end portions adapted to engage said pair of longitudinally extending parallel coupling members for pretensioning and uniformly spacing thereof to facilitate placing said extricating device upon said driving tires.

10. A device for extricating an immobilized rubber tired vehicle as described in claim 1, wherein said traction intensifying means includes a plurality of resilient traction bars.

* * * * *